Aug. 7, 1923.

F. P. WHITAKER

DYNAMO ELECTRIC MACHINE

Filed Nov. 1, 1920

Inventor:
Frank P. Whitaker,
by Albert G. Davis
His Attorney.

Patented Aug. 7, 1923.

1,464,123

UNITED STATES PATENT OFFICE.

FRANK PERCY WHITAKER, OF RUGBY, ENGLAND, ASSIGNOR TO GENERAL ELECTRIC COMPANY, A CORPORATION OF NEW YORK.

DYNAMO-ELECTRIC MACHINE.

Application filed November 1, 1920. Serial No. 420,924.

*To all whom it may concern:*

Be it known that I, FRANK PERCY WHITAKER, a subject of the King of Great Britain, residing at Rugby, in the county of Warwickshire, England, have invented certain new and useful Improvements in Dynamo-Electric Machines, of which the following is a specification.

This invention relates to dynamo electric machines and more particularly to commutating machines of high speed and output. As a means for improving the commutation of such machines it is advantageous to employ multiplex windings, but in the past their operation has been uncertain due in part to a tendency of the brushes to chatter or tip on edge and thereby open the circuit of one of the windings. I find that by arranging the brushes in a manner hereinafter to be described I am able to avoid this defect.

Figure 1:
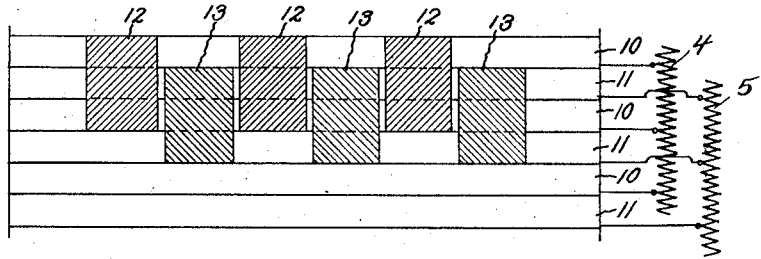
Figure 2:
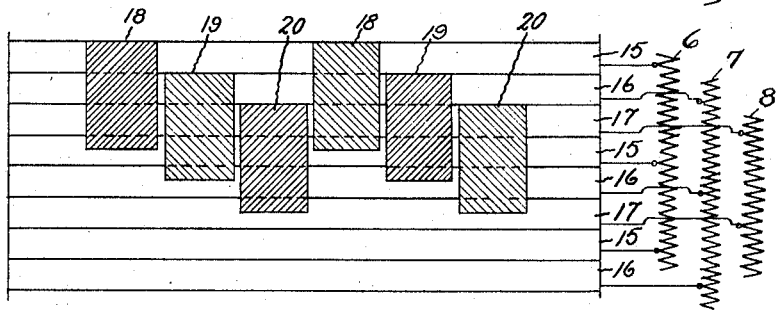
Figure 3:
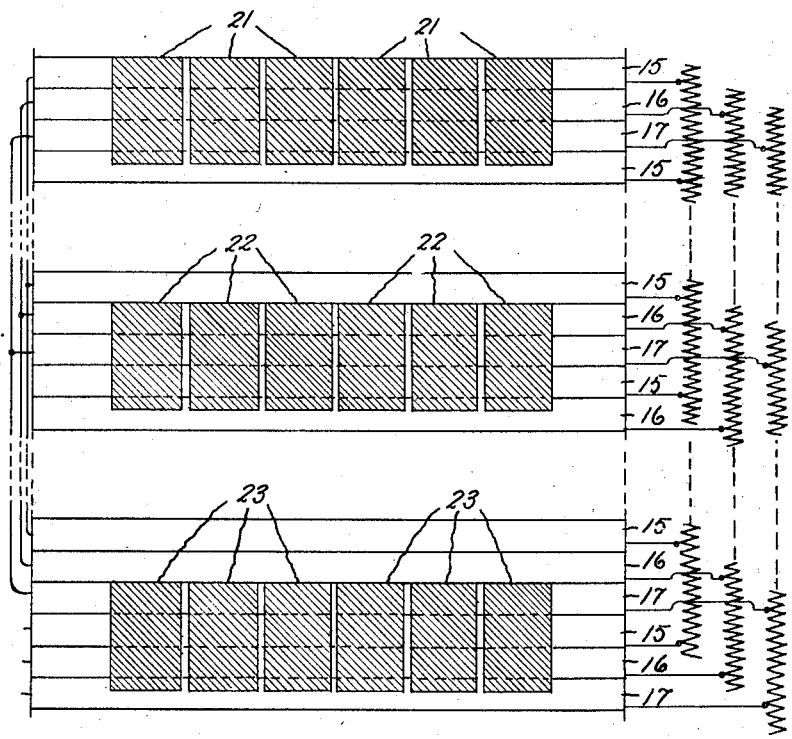

Other objects and advantages will appear from the following description taken in connection with the accompanying drawing wherein, Fig. 1 represents the development of a portion of the commutator designed for use with a duplex winding and showing the brushes arranged in accordance with my invention; Fig. 2 is a view similar to Fig. 1 but showing the brush arrangement designed for use with a triplex winding; Fig. 3 shows the development of a commutator arranged for use with the triplex winding but showing a different arrangement from that shown in Fig. 2.

The dynamo electric machine with which the commutating device shown in Fig. 1 is adapted to be used is provided with a winding 4 connected to segments 10 and a separate parallel winding 5 connected to segments 11. The brushes shown which are electrically connected together are divided into two groups. One group comprises alternate brushes 12 and the remaining group alternate brushes 13. Each brush as shown embraces substantially three commutator segments and the brushes of one group are arranged in advance of those of the other group by substantially the width of one commutator segment. It will be observed that should one group of brushes be tilted on edge and so only be in contact with one winding, due for example to roughness of the commutator surface, there will still remain the other group of brushes bearing against the commutator in electrical connection with the other winding, the latter group of brushes being movable independently of the former group.

In Fig. 2 the commutator is adapted for use with an armature having three windings, 6, 7, and 8, winding 6 being connected to segments 15, winding 7 being connected to segments 16 and winding 8 being connected to segments 17. The brushes are divided into three groups, one group comprising brushes 18, one comprising brushes 19 spaced circumferentially from the brushes 18 by approximately the width of one segment and one comprising brushes 20 spaced from brushes 19 by approximately the width of one segment. It will thus be observed that each group of brushes bear at their edges (that is, the edges of the brushes which are normally parallel to the axis of the commutator) against segments connected to different windings. The brushes as shown embrace somewhat more than three segments.

Fig. 3 shows an alternative form to that shown in Fig. 2 and is adapted for use with machines wherein the commutator is fully equalized, that is, where each segment is connected to the corresponding segments at the other poles of the same sign. This arrangement is designed for use in a six pole machine and as shown the group comprising brushes 21 is spaced from that comprising brushes 22 by approximately the width of one commutator segment less than two pole pitches. In a similar manner the group comprising brushes 23 is spaced from the group of brushes 22 by the width of one commutator segment less than the two pole pitches.

What I claim as new and desire to secure by Letters Patent of the United States, is:—

1. A dynamo electric machine having a commutator, brushes and a plurality of windings connected to successive commutator segments, there being a number of brushes of each polarity corresponding to the number of windings, said brushes being independently movable to conform to the commutator and so spaced from one another that they will bear at their forward edges upon commutator segments which are connected to different windings.

2. A dynamo electric machine having a commutator, brushes and a plurality of separate windings connected to successive commutator segments, the brushes of each polarity being divided into groups corresponding in number to the number of windings, the said groups being movable independently to conform to the commutator and being spaced from one another such that the brushes of different groups will bear at their edges upon commutator segments which are connected to different windings.

3. A dynamo electric machine having a commutator, brushes and a plurality of separate windings connected to successive commutator segments, the brushes of each polarity being divided into groups corresponding in number to the number of windings, the said groups being spaced from one another such that the brushes of different groups will bear at their edges upon commutator segments which are connected to different windings, and each of said brushes being of sufficient width to bear upon segments connected to all of said windings.

4. A dynamo electric machine having a commutator, brushes and a plurality of separate windings connected to successive commutator segments, the brushes of each polarity being divided into groups corresponding in number to the number of windings, the said groups being spaced from one another such that the brushes of different groups will bear at their rear edges upon commutator segments which are connected to different windings, and each of said brushes being of sufficient width to bear upon segments connected to all of said windings.

In witness whereof, I have hereunto set my hand this 26th day of October, 1920.

FRANK PERCY WHITAKER.